United States Patent [19]

Jamieson

[11] Patent Number: 5,791,595
[45] Date of Patent: Aug. 11, 1998

[54] PROPELLER BALANCING METHOD AND APPARATUS

[76] Inventor: Frederick T. Jamieson, 3219 Monier Cr., Rancho Cordova, Calif. 95742

[21] Appl. No.: 512,550

[22] Filed: Aug. 8, 1995

[51] Int. Cl.⁶ ................................................ B64C 11/20
[52] U.S. Cl. ........................... 244/65; 29/901; 29/406; 416/500
[58] Field of Search ............ 244/1 R, 65; 416/500; 29/901, 406, 889; 74/573 R

[56] References Cited

U.S. PATENT DOCUMENTS

| | | | |
|---|---|---|---|
| 1,428,620 | 9/1922 | Wilber | 29/901 |
| 2,140,398 | 12/1938 | Buckingham | 29/901 |
| 2,315,998 | 4/1943 | Haeger | 29/901 |
| 3,307,251 | 3/1967 | Magyar | 29/406 |

*Primary Examiner*—Galen L. Barefoot
*Attorney, Agent, or Firm*—Larry D. Johnson

[57] ABSTRACT

A propeller balancing method and apparatus provides relocation of the propeller's center mounting hole to the propeller's center of mass. The method uses a conventional balance stand, by first attaching a balanced drill guide fixture to the hub of the propeller in such a way that the drill guide fixture can be moved slightly relative to the propeller hub to achieve balance and define a new center for the propeller. Once balance is achieved, the fixture and propeller assembly is removed from the balance stand. Then, a new oversize hole can be drilled in the propeller hub through the drill guide, and an appropriate (concentric) bushing installed.

6 Claims, 1 Drawing Sheet

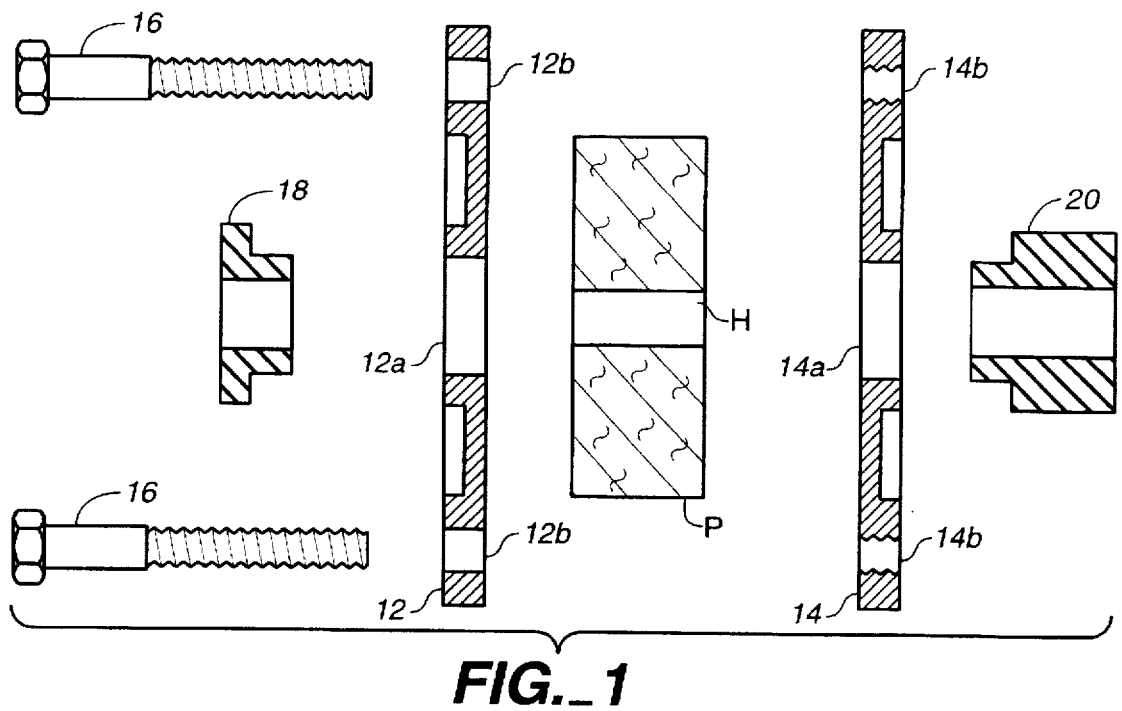
FIG._1
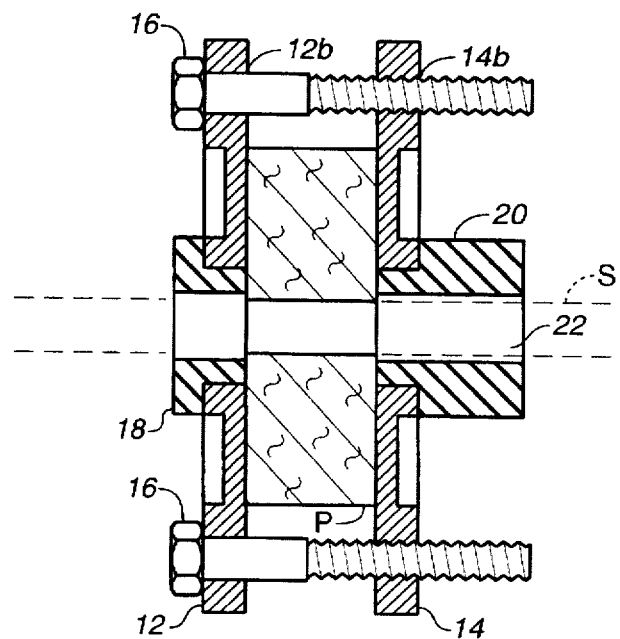
FIG._2

PROPELLER BALANCING METHOD AND APPARATUS

BACKGROUND OF THE INVENTION

1. Field of the Invention

This invention relates generally to aircraft propeller hardware and maintenance, and more specifically to an improved method and apparatus for propeller balancing, particularly for model aircraft propellers.

2. Description of the Prior Art

The conventional method of balancing a propeller (for both model aircraft and full-size aircraft) is to alter the propeller itself by attempting to move the propeller's center of gravity to align with the propeller's center mounting hole. In the case of a two-bladed propeller, this is often accomplished by placing the propeller on a balance stand and adding mass (weight) to the light blade(s), and/or removing mass (weight) from the heavy blade(s). This is a cumbersome and time-consuming process, and requires provision for weights and their attachment to the propeller blades. In addition, this process may result in having to refinish a blade if too much or inappropriate material was removed.

SUMMARY OF THE INVENTION

The propeller balancing method and apparatus of this invention provides a simple and efficient way to balance propeller blades including, but not limited to, those used on model aircraft. The inventive method comprises relocation of the propeller's center mounting hole to the propeller's center of mass. This is accomplished with the use of a conventional balance stand, by first attaching a balanced drill guide fixture to the hub of the propeller (as by lightly tightened screws) in such a way that the drill guide fixture can be moved slightly relative to the propeller hub and balancing shaft to achieve balance and define a new center mounting hole for the propeller (there needs to be sufficient space between the aperture of the drill guide fixture and the balance stand balancing shaft to allow this movement). Once the propeller/fixture assembly is balanced on the stand (i.e., the center of gravity has been aligned by appropriate relocation of the drill guide), the fixture screws are more securely tightened and the assembly is removed from the balance stand. Then, a new oversize hole can be drilled in the propeller hub through the drill guide. The fixture can then be removed and an appropriate (concentric) bushing installed, if necessary or desired, to reduce the propeller center hole size back to the original diameter. The axis of the propeller's new center hole now passes through the center of gravity of the propeller, which can be verified by a retest on the balance stand.

BRIEF DESCRIPTION OF THE DRAWINGS

FIG. 1 is an exploded cross-sectional view of the components of a propeller balancing apparatus of this invention; and FIG. 2 is a cross-sectional view of the components of the propeller balancing apparatus of FIG. 1 as affixed to a propeller hub.

DETAILED DESCRIPTION OF A PREFERRED EMBODIMENT

FIG. 1 is an exploded cross-sectional view of the components of the propeller balancing apparatus 10 of this invention, while FIG. 2 is a cross-sectional view of the components as affixed to a propeller hub P having a center mounting hole H and placed on a balance stand balancing shaft S. The components include a first clamp or fixture half 12 bearing a central drill aperture 12a and a pair of screw holes 12b, and a second clamp or fixture half 14 also bearing a central drill aperture 14a and a pair of screw holes 14b. The complementary fixture halves 12, 14 are adapted to be placed on opposite sides of the propeller hub P, and screws 16 inserted through holes 12b and 14b to bring the halves 12, 14 together and capture the propeller hub P therebetween. Guide bushings 18, 20 are threaded or otherwise secured to the fixture halves 12, 14 to define a drill aperture 22. Alternatively, the new center hole could be drilled through aperture 12a/14a, without use of the guide bushings. In either case, the aperture defined for subsequent drilling has a diameter greater than the diameter of the propeller's original center mounting hole H, so that the fixture can be moved perpendicular to the aperture without interference from the balance shaft S.

The fixtures halves and other components of the apparatus can be manufactured by plastic injection molding or other similar process, or be manufactured from die-cast metal or similar process. It is important that the components be made as symmetrical as possible (about the axis of the aperture), so that the balance achieved will be as true as possible.

While this invention has been described in connection with preferred embodiments thereof, it is obvious that modifications and changes therein may be made by those skilled in the art to which it pertains without departing from the spirit and scope of the invention. Accordingly, the scope of this invention is to be limited only by the appended claims.

What is claimed as invention is:

1. A method for balancing a propeller, said propeller having a plurality of propeller blades disposed about a hub having a center mounting hole, said method comprising the steps of:

providing a balance stand having a balance shaft;

affixing a first balanced drill guide fixture half onto a first side of the propeller adjacent the propeller center mounting hole, and a second balanced drill guide fixture half onto a second side of the propeller adjacent the propeller mounting hole, said balanced drill guide fixture halves each having a central aperture having a diameter greater than the diameter of the propeller center mounting hole;

moving said balanced drill guide fixture halves relative to the propeller center mounting hole until balance is achieved on said balance stand;

removing said balance drill guide fixture halves and propeller from said balance stand; and drilling a new propeller center mounting hole as defined by said balance drill guide fixture halves central apertures.

2. The method for balancing a propeller of claim 1 further including the step of:

inserting a concentric bushing into the new propeller center mounting hole after drilling to reduce the diameter of the center mounting hole.

3. The method for balancing a propeller of claim 1 further including the step of tightening the balanced drill guide fixture halves on said propeller after said step of moving said balanced drill guide fixture halves relative to the propeller center mounting hole and before said step of drilling a new propeller center mounting hole.

4. An apparatus for balancing a propeller, said propeller having a plurality of propeller blades disposed about a hub having a center mounting hole, said apparatus comprising:

a balance stand having a balance shaft;

a balanced drill guide fixture having a first fixture half and a second fixture half, each of said fixture halves bearing a central drill aperture having a diameter greater than the diameter of the propeller center mounting hole; and fastening means to releasably secure said fixture halves on opposite sides of the propeller adjacent the center mounting hole.

5. The apparatus for balancing a propeller of claim 4 wherein said fastening means comprises a pair of screws adapted to secure said fixture halves together.

6. The apparatus for balancing a propeller of claim 4 further including guide bushings adapted for releasable attachment to said fixture halves central apertures.

* * * * *